US011919255B2

(12) United States Patent
Samejima et al.

(10) Patent No.: US 11,919,255 B2
(45) Date of Patent: Mar. 5, 2024

(54) METHOD AND APPARATUS FOR PRODUCING FIBER-REINFORCED RESIN MOLDING MATERIAL

(71) Applicant: Mitsubishi Chemical Corporation, Tokyo (JP)

(72) Inventors: Tadao Samejima, Tokyo (JP); Yukihiro Mizutori, Tokyo (JP); Yasushi Watanabe, Tokyo (JP); Junji Kanehagi, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 17/978,204

(22) Filed: Oct. 31, 2022

(65) Prior Publication Data

US 2023/0050464 A1    Feb. 16, 2023

Related U.S. Application Data

(62) Division of application No. 17/216,294, filed on Mar. 29, 2021, now Pat. No. 11,518,116, which is a (Continued)

(30) Foreign Application Priority Data

Jul. 7, 2015 (JP) ................................ 2015-136084
Apr. 11, 2016 (JP) ................................ 2016-078937

(51) Int. Cl.
  *B29C 70/00* (2006.01)
  *B29B 11/00* (2006.01)
  (Continued)

(52) U.S. Cl.
  CPC .............. *B29C 70/10* (2013.01); *B29B 11/02* (2013.01); *B29B 15/122* (2013.01); *B29C 70/42* (2013.01);
  (Continued)

(58) Field of Classification Search
  CPC ......... B29C 70/00; B29C 70/10; B29C 70/40; B29C 70/42; B29B 11/00; B29B 11/02;
  (Continued)

(56) References Cited

U.S. PATENT DOCUMENTS 5,001,172 A * 3/1991 Tsuchiya .................. C08K 7/04
                                                523/222
5,001,956 A    3/1991 Nitsch et al.
(Continued)

FOREIGN PATENT DOCUMENTS

CN        1227473 A    9/1999
CN        1350082 A    5/2002
(Continued)

OTHER PUBLICATIONS

Office Action issued in U.S. Appl. No. 17/216,294 dated Apr. 11, 2022.
(Continued)

*Primary Examiner* — Jacob T Minskey
*Assistant Examiner* — Matthew Hoover
(74) *Attorney, Agent, or Firm* — Morgan, Lewis & Bockius LLP

(57) ABSTRACT

Provided are a method and an apparatus for manufacturing a fiber-reinforced resin molding material by which, when the fiber-reinforced resin molding material is manufactured, separated fiber bundles can be supplied to a cutting machine in stable condition while avoiding the influence of meandering of the fiber bundles or slanting or meandering of filaments occurring in the fiber bundles. A method for manufacturing a sheet-shaped fiber-reinforced resin molding material in which spaces between filaments of cut-out fiber bundles (CF) are impregnated with resin includes, so that a condition of the following expression (1) is satisfied, intermittently separating fibers of the continuous fiber bundles (Continued)

(CF) in a longitudinal direction by a rotational blade (18) serving as a fiber separating part and cutting out the fiber bundles with an interval therebetween in a longitudinal direction of a cutting machine (13A) to obtain the cut-out fiber bundles (CF). Expression (1): 1≤a/L (where a represents a length of a separated part of the continuous fiber bundles (CF) and L represents an interval when the fiber bundles (CF) are cut out in the longitudinal direction.)

14 Claims, 5 Drawing Sheets

Related U.S. Application Data division of application No. 15/741,615, filed as application No. PCT/JP2016/070117 on Jul. 7, 2016, now abandoned.

(51) Int. Cl.

| | | |
|---|---|---|
| *B29B 11/02* | (2006.01) | |
| *B29B 15/00* | (2006.01) | |
| *B29B 15/12* | (2006.01) | |
| *B29C 70/10* | (2006.01) | |
| *B29C 70/42* | (2006.01) | |
| *B65H 35/00* | (2006.01) | |
| *B65H 35/08* | (2006.01) | |
| *D01D 11/00* | (2006.01) | |
| *D01D 11/02* | (2006.01) | |
| *B29K 31/00* | (2006.01) | |
| *B29K 307/04* | (2006.01) | |

(52) U.S. Cl.
CPC ......... *B65H 35/0086* (2013.01); *B65H 35/08* (2013.01); *D01D 11/02* (2013.01); *B29C 2793/0081* (2013.01); *B29K 2031/00* (2013.01); *B29K 2307/04* (2013.01)

(58) Field of Classification Search
CPC ......... B29B 15/00; B29B 15/10; B29B 15/12; B29B 15/122; B65H 35/00; B65H 35/008; B65H 35/0086; B65H 35/08; D01D 11/00; D01D 11/02
See application file for complete search history.

(56) References Cited

U.S. PATENT DOCUMENTS

| | | | |
|---|---|---|---|
| 5,904,793 A | 5/1999 | Gorman et al. | |
| 6,385,828 B1 | 5/2002 | Kiss et al. | |
| 6,508,906 B1 | 1/2003 | Bradish | |
| 7,571,524 B2 | 8/2009 | Kawabe et al. | |
| 2002/0026699 A1* | 3/2002 | Hayashi | D02J 1/18 |
| | | | 28/282 |
| 2006/0137156 A1 | 6/2006 | Kawabe et al. | |
| 2006/0204753 A1 | 9/2006 | Simmonds et al. | |
| 2010/0215887 A1 | 8/2010 | Kawabe | |
| 2012/0213997 A1* | 8/2012 | Wang | D01G 1/04 |
| | | | 28/282 |
| 2013/0106014 A1 | 5/2013 | Ishibashi et al. | |
| 2015/0203642 A1 | 7/2015 | Sonoda et al. | |
| 2015/0203663 A1 | 7/2015 | Sonoda et al. | |
| 2015/0273736 A1 | 10/2015 | Schneider et al. | |
| 2015/0292145 A1 | 10/2015 | Sonoda et al. | |
| 2017/0355550 A1 | 12/2017 | Kawahara et al. | |
| 2018/0194082 A1 | 7/2018 | Samejima et al. | |
| 2018/0257265 A1 | 9/2018 | Mizutori et al. | |
| 2019/0084186 A1 | 3/2019 | Motohashi et al. | |
| 2019/0153632 A1 | 5/2019 | Motohashi et al. | |
| 2019/0161890 A1 | 5/2019 | Motohashi et al. | |
| 2019/0177888 A1 | 6/2019 | Motohashi et al. | |
| 2019/0263625 A1 | 8/2019 | Motohashi et al. | |

FOREIGN PATENT DOCUMENTS

| | | |
|---|---|---|
| CN | 101466535 A | 6/2009 |
| CN | 102704131 A | 10/2012 |
| CN | 102958657 A | 3/2013 |
| CN | 104520358 A | 4/2015 |
| DE | 102012101077 A1 | 8/2012 |
| EP | 2015136084 A | 7/2015 |
| EP | 3195994 A1 | 7/2017 |
| EP | 3239372 A1 | 11/2017 |
| EP | 3321054 A1 | 5/2018 |
| EP | 3395551 A1 | 10/2018 |
| JP | 01-163219 A | 6/1989 |
| JP | 02-175729 A | 7/1990 |
| JP | 08-192424 A | 7/1996 |
| JP | 2006-219780 A | 8/2006 |
| JP | 2008-254191 | 10/2008 |
| JP | 2009-191238 | 8/2009 |
| JP | 2010-163536 A | 7/2010 |
| JP | 2011-241494 A | 12/2011 |
| JP | 2013-133378 A | 7/2013 |
| JP | 2014-210991 A | 11/2014 |
| JP | 2016-078937 A | 5/2016 |
| JP | WO2017/159263 A1 | 9/2017 |
| JP | 6315101 B | 4/2018 |
| JP | 6447518 A | 1/2019 |
| WO | 2004/007157 A1 | 1/2004 |
| WO | 2017/006989 A1 | 1/2007 |
| WO | 2014/021315 A1 | 2/2014 |
| WO | 2014/067763 A1 | 5/2014 |
| WO | 2014/208626 A1 | 12/2014 |
| WO | 2016-043037 A1 | 3/2016 |
| WO | 2016/104154 A1 | 6/2016 |
| WO | 2016/136812 A1 | 9/2016 |
| WO | 2017/110912 A1 | 6/2017 |
| WO | 2017/221655 A1 | 12/2017 |
| WO | 2017/221656 A1 | 12/2017 |
| WO | 2017/221657 A1 | 12/2017 |
| WO | 2017/221658 A1 | 12/2017 |

OTHER PUBLICATIONS

Office Action issued in U.S. Appl. No. 15/741,615 dated Apr. 17, 2020.
Office Action issued in U.S. Appl. No. 15/741,615 dated Oct. 29, 2020.
Notice of Opposition issued in corresponding European Patent Application No. 16821457.5 dated Oct. 10, 2022.
Extended Search Report issued in corresponding European Application No. 22163187.2 dated Sep. 16, 2022.
Search Report issued in European Patent Application No. 22163187.2 dated Jul. 1, 2022.
Notice of Opposition dated May 27, 2022 issued in corresponding European Patent Application No. 20178020.2.
First Office Action dated Dec. 7, 2021 in corresponding Chinese Application No. 202010921119.8.
Oral Proceedings dated Jan. 28, 2022 in corresponding European Patent Application No. 16821457.5.
Office Action issued in corresponding Chinese Application No. 202010418399.0 dated Aug. 24, 2021.
Office Action issued in corresponding Japanese Patent Application No. 2018-131533 dated Sep. 14, 2021.
Office Action ossued in corresponding Japanese Patent Application No. 2020-187934 dated Aug. 17, 2021.
Extended European Search Report issued in corresponding European Patent Application No. 21171166.8 dated Jul. 28, 2021.
Notice of Opposition dated May 25, 2021 issued in corresponding European Patent Application No. 16821457.5.
Office Action dated May 25, 2021 issued in corresponding Japanese Patent Application No. 2018-131533.
Office Action dated Jun. 15, 2021 issued in corresponding Japanese Patent Application No. 2020-126738.
International Search Report issued in PCT/JP2016/088441 dated Apr. 4, 2017.

(56) References Cited

OTHER PUBLICATIONS

Combined Chinese Office Action and Search Report dated Aug. 5, 2019 in Patent Application No. 201680074834.4, citing document OA therein, 16 pages (with unedited computer generated English translation).

Extended Search Report dated Dec. 3, 2018 in European Patent Application No. 16878942.8.

Office Action issued in related U.S. Appl. No. 15/970,935 dated May 14, 2020.

Extended European Search Report issued in corresponding European Patent Application No. 20178020.2 dated Sep. 14, 2020.

Office Action issued in corresponding Japanese Patent Application No. 2017-133132 dated May 26, 2020.

Extended European Search Report issued in corresponding European Patent Application No. 16821457.5, dated Jul. 24, 2018.

International Search Report issued in corresponding International Application No. PCT/JP2016/070117 dated Aug. 30, 2016.

Japan Society for Composite Materials, Composite Material Handbook, 1st edition, The Nikkan Kogyo Shimbun, Ltd. 1989, pp. 553-561.

Submission of Information filed in Japanese Patent Application No. 2016-548745 with a mailing date of Aug. 15, 2017.

Communication regarding Third Party observation, in International Patent Application No. PCT/JP2016/070117 with a mailing date of Nov. 7, 2017.

Office Action issued in corresponding Japanese Patent Application No. 2018-131533 dated Feb. 16, 2021.

Restriction Requirement issued in U.S. Appl. No. 15/741,615 dated Jan. 7, 2020.

Interlocutory Decision in Opposition Proceeding issued in related European Application No. 16821457.5 dated Mar. 22, 2023.

Summons to attend oral proceedings issued Oct. 10, 2023 for counterpart European Patent Application No. 20178020.2.

Notice of Opposition dated Dec. 5, 2023, issued in corresponding European Patent Application No. 16821457.5.

\* cited by examiner

METHOD AND APPARATUS FOR PRODUCING FIBER-REINFORCED RESIN MOLDING MATERIAL

The present invention relates to a method and an apparatus for producing a fiber-reinforced resin molding material. The present application is a divisional application of U.S. application Ser. No. 17/216,294, filed Mar. 29, 2021, which is a divisional application of U.S. application Ser. No. 15/741,615, filed Jan. 3, 2018, which is a 371 application of PCT/JP2016/070117, filed Jul. 7, 2016, which application is based upon, and claims the benefit of, priority to Japanese Application Nos. 2015-136084, filed Jul. 7, 2015, and 2016-078937, filed Apr. 11, 2016, the entire contents of which are incorporated herein by reference.

TECHNICAL FIELD

Background Art

As for molding materials that exhibit excellent mechanical characteristics in molded articles and are suitable for molding complex features such as three-dimensional shapes, sheet molding compounds (SMCs) and stampable sheets are known. SMCs are sheet-type fiber-reinforced resin molding materials formed by impregnating thermosetting resins such as unsaturated polyester resins among filaments of cut fiber bundles of reinforcing fibers, for example, glass fibers and carbon fibers. Stampable sheets are sheet-type fiber-reinforced resin molding materials formed by impregnating thermoplastic resins into the above-mentioned cut fiber bundles, for examples.

An SMC is an intermediate material for obtaining molded articles. In a molding process, an SMC is compression-molded (pressed) in a die while heat is applied on the SMC. During that time, fiber bundles and a thermosetting resin are integrated and flowed to fill the cavity of a die, and the thermosetting resin is cured therein. Thus, SMCs are capable of forming molded articles with various shapes, for example, articles having partially different thicknesses or having ribs and bosses. Molded articles made of a stampable sheet are obtained by heating the stampable sheet at or above the melting point of the thermoplastic resin using an infrared heater or the like, and then by compressing the sheet while cooling it in a die set at a predetermined temperature.

In the above-mentioned production process of an SMC (fiber-reinforced resin molding material), after a paste containing a thermosetting resin is coated on a sheet (carrier) while the sheet is transported, continuous fiber bundles, cut with a cutter to a predetermined length, are spread on the paste (see Patent Literatures 1 and 2, for example).

In addition, to lower the production cost of SMCs, a relatively low-cost fiber bundle, called a large tow, having a greater number of filaments is used; the fiber bundle is first widened in a width direction (referred to as fiber opening), the opened fiber bundle is divided into multiple fiber bundles (referred to as fiber separation), and then the separated fiber bundles are cut with a cutter.

However, in conventional production methods, when filaments become askew or meander in fiber bundles, some of the opened fiber bundles remain unseparated, or some fiber bundles break, possibly causing an unstable supply of opened and separated fiber bundles to a cutter. The same situation may be observed with stampable sheets.

More specifically, Patent Literature 1 discloses a method for separating opened fiber bundles by piercing the bundles with protruding objects. However, when such a method is used, if filaments in fiber bundles are askew or meandering, fiber bundles that are supposed to be separated will remain unseparated after the cutting process. Accordingly, there is a risk of having unseparated fiber bundles.

Meanwhile, Patent Literature 2 discloses a method for continuously separating opened fiber bundles by using a rotary blade in rotational motion. However, when such a method is used, if filaments become askew or meander in fiber bundles, some of the separated fiber bundles break, and broken fiber bundles may wrap around the roll or the like.

CITATION LIST

Patent Literature

Patent Literature 1: Specification of US2012/0213997 A1
Patent Literature 2: JP2006-219780A

SUMMARY OF THE INVENTION

Problems to be Solved by the Invention

The present invention was carried out in consideration of conventional problems described above. Its objective is to provide a method and apparatus for producing a fiber-reinforced resin molding material capable of supplying separated fiber bundles in a stable condition to the cutter when producing a sheet-type fiber-reinforced resin molding material formed by impregnating a resin among filaments of cut fiber bundles, while maintaining the quality of fiber-reinforced resin molding material and avoiding impact stemming from meandering fiber bundles or askew or meandering filaments that may occur in fiber bundles.

Solutions to the Problems

To achieve the above objective, the present invention provides the following.
[1] A method for producing a sheet-type fiber-reinforced resin molding material that is formed by impregnating a resin among filaments of cut fiber bundles,
in which the cut fiber bundles are obtained by intermittently separating a continuous fiber bundle in a longitudinal direction and by cutting the fiber bundles at intervals in the longitudinal direction to satisfy the condition specified in formula (1) below.

$$1 \leq a/L \qquad (1)$$

(In formula (1), "a" is the length of a separated portion of the continuous fiber bundle, and "L" is the interval for cutting the fiber bundles in a longitudinal direction.)
[2] The method for producing a fiber-reinforced resin molding material according to [1], in which separation and cutting are conducted to further satisfy the condition specified in formula (2) below.

$$a/L \leq 10 \qquad (2)$$

[3] A method for producing a sheet-type fiber-reinforced resin molding material that is formed by impregnating a resin among filaments of cut fiber bundles,
in which the cut fiber bundles are obtained by intermittently separating a continuous fiber bundle in a longitudinal direction and by cutting the fiber bundles at intervals in the longitudinal direction to satisfy the condition specified in formula (3) below.

$$0.9 \leq a/(a+b) < 1 \qquad (3)$$

(In formula (3), "a" is the length of a separated portion of the continuous fiber bundle, and "b" is the length of an unseparated portion that is present between portions intermittently separated in the continuous fiber bundle.)

[4] The method for producing a fiber-reinforced resin molding material according to any of [1]~[3], in which the resin is a thermosetting resin.

[5] The method for producing a fiber-reinforced resin molding material according to any of [1]~[4], in which the intermittent separation is conducted by intermittently piercing the continuous fiber bundle with a blade.

[6] The method for producing a fiber-reinforced resin molding material according to any of [1]~[5], in which a series of multiple blades, aligned at predetermined intervals in a width direction of the continuous fiber bundle, pierce the continuous fiber bundle intermittently so as to form partially unseparated portions among multiple separated fiber bundles.

[7] The method for producing a fiber-reinforced resin molding material according to any of [1]~[6], including: a step for coating a resin-containing paste on a first sheet transported in a predetermined direction; a step for separating a continuous fiber bundle into multiple fiber bundles; a step for cutting the separated fiber bundles with a cutter and spreading the cut fiber bundles on the paste; and a step for impregnating the resin among filaments of the fiber bundles by laminating a second sheet with the coated paste onto the first sheet with the fiber bundles spread thereon and by compressing the paste and fiber bundles sandwiched between the first and second sheets.

[8] The method for producing a fiber-reinforced resin molding material according to [7], in which in the step for separating a continuous fiber bundle into multiple fiber bundles, multiple rotary blades, aligned at predetermined intervals in a width direction of a continuous fiber bundle and each having a series of multiple teeth in its circumferential direction, are used so that the multiple teeth intermittently pierce the continuous fiber bundle while the multiple rotary blades rotate.

[9] The method for producing a fiber-reinforced resin molding material according to [7], in which in the step for separating a continuous fiber bundle into multiple fiber bundles, saw blades with multiple teeth, aligned in a direction the same as the transport direction of the fiber bundle, are used so that the multiple teeth intermittently pierce the continuous fiber bundle while the saw blades oscillate vertically.

[10] The method for producing a fiber-reinforced resin molding material according to any of [7]~[9], in which in the step for separating a continuous fiber bundle into multiple fiber bundles, continuous fiber bundles are laminated in a thickness direction and are separated into multiple fiber bundles.

[11] The method for producing a fiber-reinforced resin molding material according to any of [7]~[10], in which in the step for separating a continuous fiber bundle into multiple fiber bundles, the continuous fiber bundle is opened in the width direction, and then the opened fiber bundle is separated into multiple fiber bundles.

[12] An apparatus for producing a sheet-type fiber-reinforced resin molding material that is formed by impregnating a resin among filaments of cut fiber bundles, including a separation unit for separating a continuous fiber bundle into multiple fiber bundles, and a cutting unit for cutting separated fiber bundles with a cutter, in which the separation unit forms partially unseparated portions among multiple separated fiber bundles by intermittently piercing the continuous fiber bundle with a blade.

[13] The apparatus for producing a fiber-reinforced resin molding material according to [12], in which the blade is set to be a series of multiple blades aligned at predetermined intervals in a width direction of the continuous fiber bundle.

[14] The apparatus for producing a fiber-reinforced resin molding material according to [12] or [13], including: a coating unit for coating a resin-containing paste on a first sheet transported in a predetermined direction; the separation unit; a cutting unit for cutting the separated fiber bundles with a cutter and spreading the cut fiber bundles on the paste; and an impregnation unit for impregnating the resin among filaments of the fiber bundles by laminating a second sheet with the coated paste onto the first sheet with the fiber bundles spread thereon and by compressing the paste and fiber bundles sandwiched between the first and second sheets.

[15] The apparatus for producing a fiber-reinforced resin molding material according to any of [12]~[14], in which the separation unit includes rotary blades with multiple teeth aligned in its circumferential direction and the multiple teeth pierce the continuous fiber bundle intermittently when the rotary blades rotate.

[16] The apparatus for producing a fiber-reinforced resin molding material according to any of [12]~[14], in which the separation unit includes saw blades with multiple teeth aligned in a direction the same as the transport direction of the fiber bundle and the multiple teeth intermittently pierce a continuous fiber bundle while the saw blades oscillate vertically.

[17] The apparatus for producing a fiber-reinforced resin molding material according to any of [12]~[16], further comprising paired guide members positioned on both sides of the blade in the transport direction, and from the side opposite where the paired guide members are positioned, the blade pierces the continuous fiber bundle transported between the paired guide members.

[18] The apparatus for producing a fiber-reinforced resin molding material according to any of [13]~[17], further comprising a spacer member positioned between multiple blades aligned in a width direction, in which the multiple blades pierce the continuous fiber bundle up to the point where the spacer member makes contact with the bundle.

Effects of the Invention

As described, by forming partially unseparated portions among multiple separated fiber bundles, separated fiber bundles are supplied to the cutter in a stable condition and the quality of fiber-reinforced resin molding material is maintained while avoiding the impact stemming from askew or meandering filaments that may occur in fiber bundles.

DETAILED DESCRIPTION OF THE EMBODIMENTS

Figure 1:
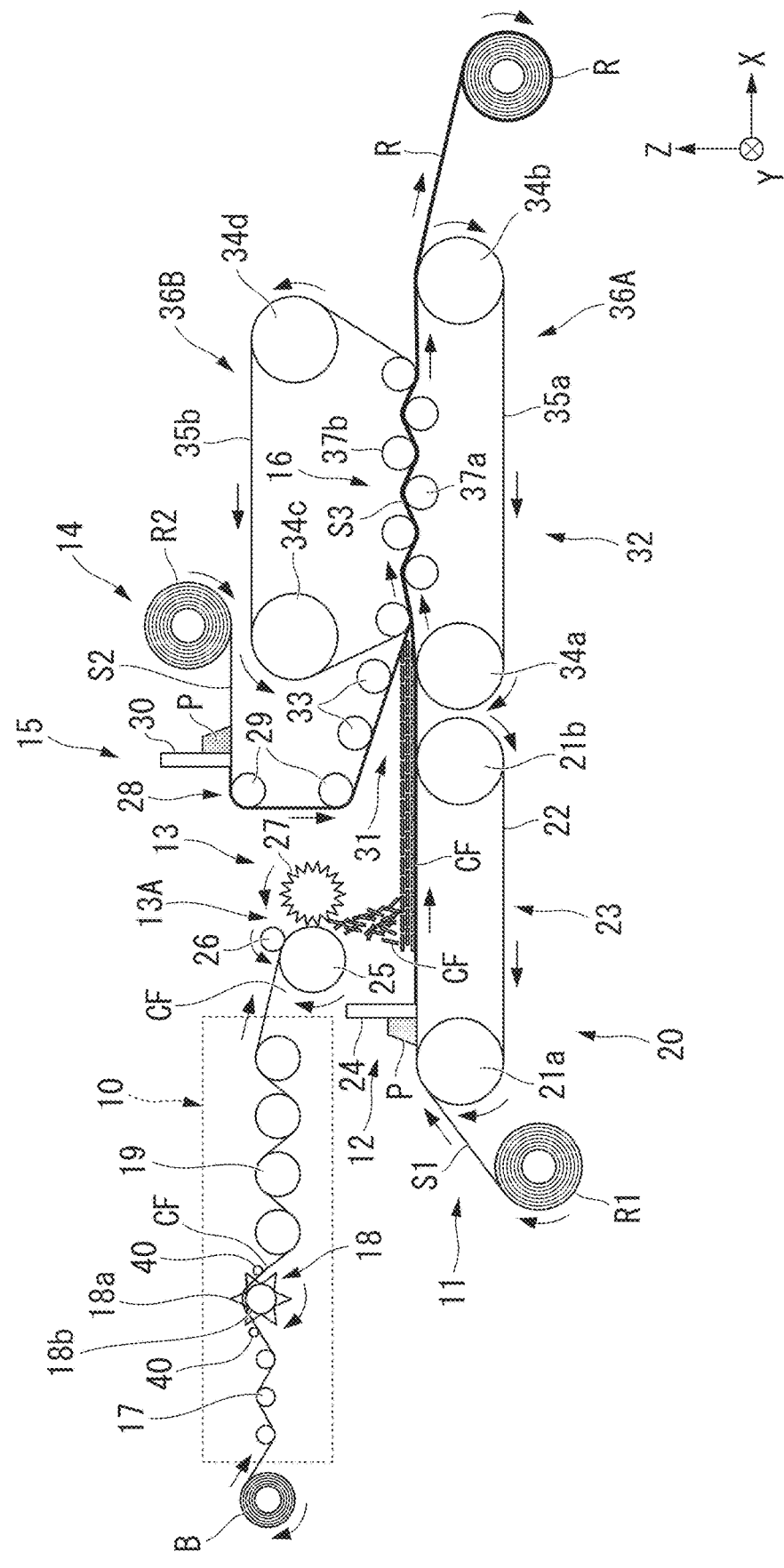
FIG. 1 is a side view showing the structure of an SMC production apparatus according to an embodiment of the present invention.

In the following, embodiments of the present invention are described in detail by referring to the attached drawings.

The material, dimensions and the like listed in the descriptions below are examples. The present invention is not limited to those examples, and may also be practiced through appropriate modifications within a scope that does not deviate from the gist of the present invention.

[Method for Producing Fiber-Reinforced Resin Molding Material]

The production method related to the present invention is for producing a sheet-type fiber-reinforced resin molding material formed by impregnating a resin among filaments of cut fiber bundles. The method is applicable for producing SMCs, stampable sheets and the like.

A fiber bundle is formed by bundling multiple reinforcing fibers. As for reinforcing fibers, carbon fibers are preferred, but that is not the only option.

Reinforcing fibers are not limited to carbon fibers. Other reinforcing fibers such as glass fibers may also be used.

Examples of a resin are thermosetting resins and thermoplastic resins; it is an option to use only a thermosetting resin or a thermoplastic resin, or use both thermosetting and thermoplastic resins. When fiber-reinforced resin material of the present embodiment is used as an SMC, using a thermosetting resin is preferred.

When fiber-reinforced resin material of the present embodiment is used as a stampable sheet, using a thermoplastic resin is preferred.

Examples of a thermosetting resin are unsaturated polyester resins, epoxy resins, vinyl ester resins, phenol resins, epoxy acrylate resins, urethane acrylate resins, phenoxy resins, alkyd resins, urethane resins, maleimide resins, cyanate resins and the like. Those thermosetting resins may be used alone or in combination thereof.

Examples of a thermoplastic resin are polyolefin resins, polyamide resins, polyester resins, polyphenylene sulfide resins, polyether ketone resins, polyether sulfone resins, aromatic polyamide resins and the like. Those thermoplastic resins may be used alone or in combination thereof.

In an embodiment of the method for producing a fiber-reinforced resin molding material according to the present invention, the cut fiber bundles are obtained by intermittently separating a continuous fiber bundle in a longitudinal direction and by cutting the fiber bundle at intervals in the longitudinal direction so as to satisfy the condition specified in formula (1) below.

$$1 \leq a/L \tag{1}$$

Note that in formula (1), "a" is the length of a separated portion of a continuous fiber bundle, and "L" is the interval for cutting the fiber bundle in a longitudinal direction.

When the value of "a/L" is smaller than 1, namely, when the length "a" of a separated portion is less than the interval "L" of a fiber bundle to be cut in a longitudinal direction, there is at least one unseparated portion in each cut portion of the fiber bundle. Therefore, it is difficult to homogeneously disperse reinforcing fibers in a production process of an SMC, for example, and the result of impregnating resin is lowered. Accordingly, the quality of the produced SMC tends to be significantly decreased. The value of "a/L" is preferred to be at least 1.05, more preferably at least 1.1.

Moreover, separation and cutting of fiber bundles in the present invention are preferred to be conducted to satisfy the condition specified in formula (2) below.

$$a/L \leq 10 \tag{2}$$

When the value of "a/L" is no greater than 10, even when filaments in a fiber bundle to be separated are askew or meandering, occurrence of fluff in cut fiber bundles along with process failure caused by fluff is more likely to be suppressed. The value of "a/L" is preferred to be no greater than 8, more preferably no greater than 5.

In another embodiment of the method for producing a fiber-reinforced resin molding material according to the present invention, a continuous fiber bundle is intermittently separated in a longitudinal direction and is cut at longitudinal intervals so as to obtain cut fiber bundles that satisfy the condition specified in formula (3) below.

$$0.9 \leq a/(a+b) < 1 \tag{3}$$

In formula (3), "a" is the length of a separated portion of a continuous fiber bundle, and "b" is the length of an unseparated portion that is present between portions intermittently separated in the continuous fiber bundle.

When the value of "a/(a+b)" is smaller than 0.9, unseparated portions of cut fiber bundles are likely to be undetached when fiber bundles are spread on a paste in a production process of an SMC, for example. Thus, it is difficult to homogeneously disperse reinforcing fibers on the paste, and the results of impregnating resin into reinforcing fibers are lowered. Accordingly, the quality of the produced SMC tends to be decreased. The value of "a/(a+b)" is preferred to be at least 0.92.

When there is no unseparated portion (b=0), a fiber bundle is continuously separated, and the value of "a/(a+b)" is 1. However, in such a case where there is no unseparated portion, if the fiber bundle meanders or filaments in the fiber bundle are askew or meandering, some of the separated fiber bundles break, and the cut fiber bundles may wrap around a roll or the like. In the present invention, since a continuous fiber bundle is intermittently separated in its longitudinal direction, "b" is greater than zero (b>0), namely, a/(a+b)<1.

To supply separated fiber bundles to a cutter in a stable condition, the value of "a/(a+b)" is preferred to be no greater than 0.99, more preferably no greater than 0.98.

In the method for producing a fiber-reinforced resin molding material related to the present invention, it is preferred to separate and cut fiber bundles to simultaneously satisfy conditions specified in formulas (1) and (3). By so setting, when a fiber bundle is cut, at least some portions are separated. Accordingly, it is easier to prevent unseparated fiber bundles from remaining among cut fiber bundles. Even if some unseparated portions remain, they will be dispersed during the process of spreading fibers since the majority of cut fiber bundles are separated. Accordingly, the quality of the produced SMC is unlikely to be affected.

To intermittently separate a continuous fiber bundle, it is preferred for a blade to intermittently pierce a continuous fiber bundle in its longitudinal direction since a more stable separation process is conducted. Furthermore, it is more preferred to intermittently pierce a continuous fiber bundle by using a series of multiple blades aligned at predetermined intervals in a width direction of the continuous fiber bundle so that partially unseparated portions are made among the separated multiple fiber bundles.

In the present invention, a blade means an object in a plate shape, its tip that touches a fiber bundle first is set narrow and thin, and the cross section of the tip is substantially in a wedge shape. Examples of the material of a blade are hard materials such as metals or ceramics.

The shape of a blade is not limited specifically as long as it is capable of piercing a fiber bundle. Considering the durability of a blade and its capability of separating fibers, the maximum thickness of a blade at the portion that touches a fiber bundle is preferred to be 0.3-2 mm. The maximum width of a blade at the portion that touches a fiber bundle is preferred to be 0.5-1.5 mm. The angle of the tip portion of a blade in its width direction (point angle) is preferred to be 30°~90°. The angle of a blade in a thickness direction (cutting edge angle) is preferred to be 10°-45°, more preferably 20°-30°.

The point angle means the angle of the tip of a blade when the planar portion of the blade is seen from the front. The cutting edge angle means the angle at the tip of a blade when a side surface of the blade (the plane in a thickness direction) is seen from the front.

As a method for intermittently separating a continuous fiber bundle, instead of using a blade, a gas such as air, for example, may be sprayed under predetermined conditions on the above fiber bundle.

An example of a method for producing a fiber-reinforced resin molding material is the method below, including a coating step, separation step, cutting step and impregnation step:

- a coating step: coat a resin-containing paste on a first sheet being transported in a predetermined direction;
- a separation step: separate a continuous fiber bundle into multiple fiber bundles;
- a cutting step: cut the separated fiber bundles with a cutter and spread them on the paste; and
- an impregnation step: impregnate the resin among filaments of the fiber bundles by laminating a second sheet with the coated paste onto the first sheet with fiber bundles spread thereon, and by compressing the paste and fiber bundles sandwiched between the first and second sheets.

In the separation step and cutting step, fiber bundles are separated and cut to satisfy either or both of conditions (1) and (3) above so that separated fiber bundles are supplied to the cutter in a stable condition while avoiding being impacted by askew or meandering filaments that may occur in the fiber bundles.

In the separation step, it is preferred to use multiple rotary blades, each having a series of multiple teeth in its circumferential direction, aligned at predetermined intervals in a width direction of a continuous fiber bundle, so that the multiple teeth intermittently pierce the continuous fiber bundle while the rotary blades rotate.

Alternatively, it is also preferred to use saw blades with multiple teeth aligned in a direction the same as the transport direction of the fiber bundle so that the multiple teeth intermittently pierce the continuous fiber bundle while the saw blades oscillate vertically.

In the separation step, it is preferred to separate continuous fiber bundles into multiple fiber bundles when laminated in a thickness direction.

In addition, after a continuous fiber bundle is opened in a width direction, it is preferred to separate the opened fiber bundle into multiple fiber bundles in the separation step. In other words, it is preferred to further include an opening step for opening a continuous fiber bundle in a width direction prior to a separation step.

[Apparatus for Producing Fiber-Reinforced Resin Molding Material]

An apparatus for producing a fiber-reinforced resin molding material according to an embodiment of the present invention is described below in detail by referring to an SMC production apparatus shown in FIGS. 1 and 2, for example. The SMC production apparatus in the present embodiment is intended to produce a sheet-type SMC (Sheet Molding Compound), which contains fiber bundles made of carbon fibers and a thermosetting resin made of an unsaturated polyester resin, and is formed by impregnating the thermosetting resin among filaments of cut fiber bundles. Here, it is an option to use other reinforcing fibers such as glass fibers as the fiber bundles instead of carbon fibers and to use a thermoplastic resin instead of a thermosetting resin.

Figure 2A:
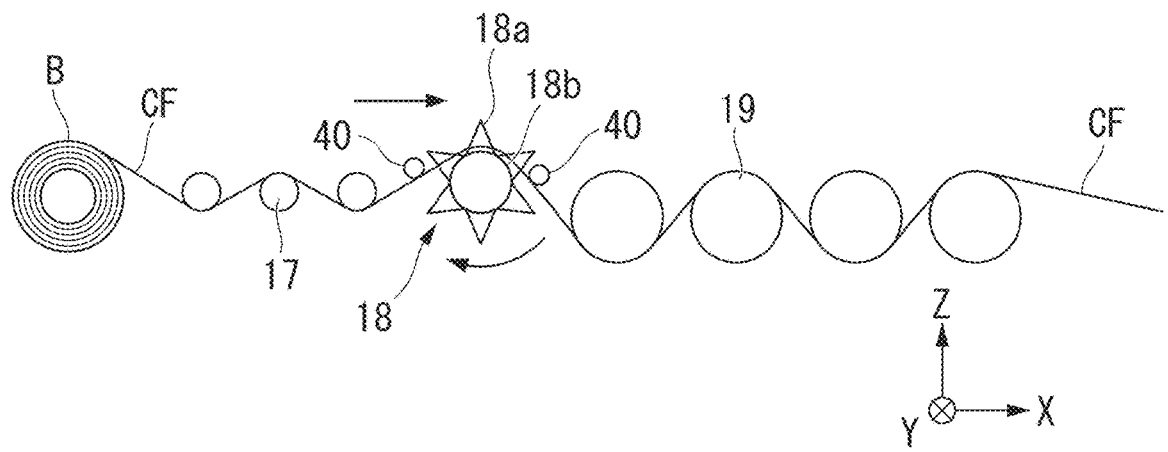
FIG. 2A is a side view showing a structural example of a fiber bundle supply unit equipped in the SMC production apparatus shown in FIG. 1.
Figure 2B:
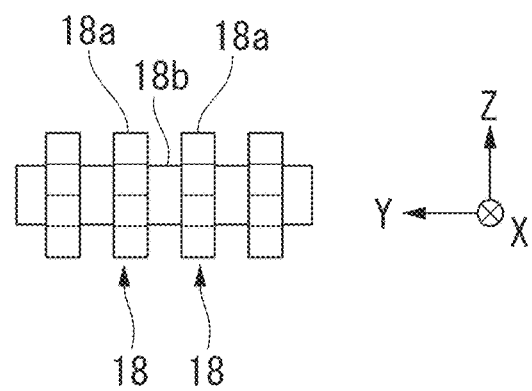
FIG. 2B is a front view of a separation unit seen from the transport direction, showing a structural example of a fiber bundle supply unit equipped in the SMC production apparatus shown in FIG. 1.

FIG. 1 is a side view showing the structure of an SMC production apparatus. FIG. 2A is a side view showing a structural example of fiber bundle supply unit 10 in the SMC production apparatus shown in FIG. 1. FIG. 2B is a front view of the separation unit seen from the transport direction. Moreover, in descriptions below, an XYZ rectangular coordinate system is set and positional relationships among members are described in accordance with the XYZ rectangular coordinate system.

As shown in FIG. 1, the SMC production apparatus of the present embodiment includes fiber bundle supply unit 10, first sheet supply unit 11, first coating unit 12, cutting unit 13, second sheet supply unit 14, second coating unit 15 and impregnation unit 16.

As enlarged in FIG. 2A, fiber bundle supply unit 10 is structured to have an opening unit for opening a continuous fiber bundle CF in a width direction (axis (Y) direction) while transporting the fiber bundle in a predetermined direction (hereinafter referred to as a transport direction), and a separation unit for separating the opened fiber bundle CF into multiple fiber bundles CF.

More specifically, fiber bundle supply unit 10 includes multiple opening bars 17, multiple rotary blades 18 and multiple godet rollers 19.

In fiber bundle supply unit 10, first, a large-tow fiber bundle CF is opened in its width direction by being drawn from bobbin B in an axis (+X) direction in FIG. 1 (in the horizontally right direction). More specifically, while passing through multiple opening bars 17 of the opening unit, a fiber bundle CF is widened in its width direction by using, for example, heat, abrasion, oscillation or the like at each opening bar 17.

The opened fiber bundle CF is separated into multiple fiber bundles CF by multiple rotary blades 18 in the separation unit. Multiple rotary blades 18 are aligned at predetermined intervals in a width direction of the opened fiber bundle CF (axis (Y) direction). A series of multiple teeth 18a are set in a circumferential direction of each rotary blade 18. Among rotary blades 18, positions of multiple teeth 18a are preferred to correspond to each other in a circumferential direction. By so setting, piercing is done more easily by each of teeth 18a of multiple rotary blades 18 aligned in a width direction of fiber bundle CF.

As shown in FIG. 2B, spacer members 18b are disposed among rotary blades 18. The circumferential surface of each spacer member 18b is positioned slightly above or slightly below the border of each of teeth 18a (blade base). By setting in such a positional relationship, the depth of piercing is adjusted. Multiple rotary blades 18 are supported to be rotatable. Accordingly, multiple rotary blades 18 are rotated in a direction the same as the transport direction of a fiber bundle CF while teeth 18a pierce the fiber bundle CF as it is transported. Multiple rotary blades 18 may be structured to be driven by a drive motor or the like so as to synchronize the rotation with the transport of a fiber bundle CF.

A pair of guide members 40 are positioned respectively on both sides of multiple rotary blades 18 in the transport direction. Multiple rotary blades 18 are positioned so that multiple teeth 18a pierce a fiber bundle CF transported between paired guide members 40 from the side opposite where paired guide members 40 are disposed.

A fiber bundle CF is separated in its width direction while rotary blades 18 are rotated so that multiple teeth 18a intermittently pierce a continuous fiber bundle CF. During that time, multiple teeth 18a pierce to the point where spacer members 18b make contact with a continuous fiber bundle CF so as to prevent the fiber bundle CF from continuously being separated by teeth 18a. Accordingly, separated multiple fiber bundles CF are not completely separated from each other, and are partially unseparated. Then, separated fiber bundles CF are supplied toward cutting unit 13 while being guided by multiple godet rollers 19.

First sheet supply unit 11 supplies continuous first sheet (S1) as it is unwound from first material roll (R1) toward first coating unit 12. The SMC production apparatus includes first transport unit 20 which transports first sheet (S1) toward impregnation unit 16.

First transport unit 20 includes conveyor 23 with endless belt 22 spanned over a pair of pulleys (21a, 21b). Conveyor 23 rotates endless belt 22 circumferentially by rotating paired pulleys (21a, 21b) in the same direction so that first sheet (S1) placed on the surface of endless belt 22 is transported in the axis (+X) direction in FIG. 1 (horizontally toward the right).

First coating unit 12 includes coater 24 which is positioned directly on first sheet (S1) transported in the axis (+X) direction in FIG. 1 (horizontally toward the right) and supplies paste (P). When first sheet (S1) passes under coater 24 in first coating unit 12, paste (P) is coated at a predetermined thickness on the surface of first sheet (S1).

As paste (P), in addition to a thermosetting resin such as the above-mentioned unsaturated polyester resins, a mixture may also be used by adding a filler such as calcium carbonate, a shrinkage-reducing agent, release agent, curing initiator, thickener or the like.

Cutting unit 13 is positioned on the downstream side of first coating unit 12 in the transport direction and cuts fiber bundles CF supplied from fiber bundle supply unit 10 by using cutter 13A and spreads cut-fiber bundles on past (P). Cutter 13A is positioned above first sheet (S1) transported by conveyor 23 and includes guide roller 25, pinch roller 26 and cutter roller 27.

Guide roller 25 rotates and guides fiber bundle CF supplied from fiber bundle supply unit 10 in the downstream direction. Pinch roller 26 sandwiches fiber bundle CF with guide roller 25 and rotates in the direction opposite that of guide roller 25 so as to cooperate with guide roller 25 to bring in separated fiber bundles CF. Cutter roller 27 rotates and cuts fiber bundles CF to a predetermined length. Cut fiber bundles CF fall from between guide roller 25 and cutter roller 27 and are spread on first sheet (S1) (paste (P)).

Second sheet supply unit 14 supplies continuous second sheet (S2) as it is unwound from second material roll (R2) toward second coating unit 15. The SMC production apparatus includes second transport unit 28 which transports second sheet (S2) toward impregnation unit 16.

Second transport unit 28 is positioned above first sheet (S1) transported by conveyor 23 and includes multiple guide rollers 29. Second transport unit 28 transports second sheet (S2) supplied from second supply unit 14 in the axis (−X) direction in FIG. 1 (horizontally toward the left), and then inverts the direction for transporting second sheet (S2) from below by rotating multiple guide rollers 29 in the axis (+X) direction in FIG. 1 (horizontally toward the right).

Second coating unit 15 is positioned directly above second sheet (S2) transported in the axis (−X) direction in FIG. 1 (horizontally toward the left) and includes coater 30 for supplying paste (P). In second coating unit 15, second sheet (S2) passes through coater 30 so that paste (P) is coated on the surface of second sheet (S2) at a predetermined thickness.

Impregnation unit 16 is positioned on the downstream side of cutting unit 13 in the transport direction and includes lamination mechanism 31 and compression mechanism 32. Lamination mechanism 31 is positioned above downstream-side pulley 21b of conveyor 23 and includes multiple lamination rollers 33.

Multiple lamination rollers 33 are positioned so as to make contact with the back surface of second sheet (S2) on which paste (P) is coated. Moreover, multiple lamination rollers 33 are positioned in such a way that second sheet (S2) gradually approaches first sheet (S1).

By setting as above, second sheet (S2) is laminated on first sheet (S1). In addition, first sheet (S1) and second sheet (S2) sandwich fiber bundles CF and paste (P) between them and are transported toward compression mechanism 32 in a laminated condition. In the following, first sheet (S1) and second sheet (S2) laminated together are collectively referred to as laminate sheet (S3).

Compression mechanism 32 is positioned on the downstream side of first transport unit 20 (conveyor 23), and includes lower conveyor 36A with endless belt 35a spanned between paired pulleys (34a, 34b) and upper conveyor 36B with endless belt 35b spanned between paired pulleys (34c, 34d).

Lower conveyor 36A and upper conveyor 36B are positioned across from each other while endless belts (35a, 35b) are set to face each other. Compression mechanism 32 rotates paired pulleys (34a, 34b) of lower conveyor 36A in the same direction to circle endless belt 35a, while rotating paired pulleys (34c, 34d) of upper conveyor 36B in the same direction so that endless belt 35b circles at the same speed as endless belt 35a but in the opposite direction. By so setting, laminate sheet (S3) sandwiched between endless belts (35a, 35b) is transported in the axis (+X) direction in FIG. 1 (horizontally toward the right).

Compression mechanism 32 includes multiple lower rollers 37a and multiple upper rollers 37b. Multiple lower rollers 37a are positioned to be in contact with the back surface of the abutting portion of endless belt 35a. In the same manner, multiple upper rollers 37b are positioned to be in contact with the back surface of the abutting portion of endless belt 35b. Multiple lower rollers 37a and multiple upper rollers 37b are alternately positioned in the transport direction of laminate sheet (S3).

Compression mechanism 32 compresses paste (P) and fiber bundles CF sandwiched between first sheet (S1) and second sheet (S2) using multiple lower rollers 37a and multiple upper rollers 37b while laminate sheet (S3) passes between endless belts (35a, 35b). During that time, paste (P) is impregnated into filaments of fiber bundles CF from both sides sandwiching fiber bundles CF. Accordingly, raw material (R) of SMC is obtained where a thermosetting resin is impregnated in filaments of fiber bundles CF.

[Method for Producing SMC]

Regarding the method for producing a fiber-reinforced resin molding material according to an embodiment of the present invention, a method for producing an SMC is described below in detail by using the above-mentioned SMC production apparatus.

In the method for producing an SMC of the present embodiment, long first sheet (S1) is unwound from first material roll (R1) in a coating step, and paste (P) is coated on first sheet (S1) by first coating unit 12 at a predetermined thickness while first sheet (S1) is transported by first transport unit 20.

Then, in an opening step, a fiber bundle CF is passed through multiple opening bars 17 so that the fiber bundle CF is widened in a width direction.

Next, in a separation step, rotary blades 18 rotate so that multiple teeth 18a intermittently pierce the opened fiber bundle CF. Accordingly, the fiber bundle CF is intermittently separated in a longitudinal direction so as to form partially unseparated portions among separated multiple fiber bundles CF. In the separation step, to prevent separated fiber bundles CF from attaching to each other, the temperature of fiber bundle CF during separation is preferred to be 60° C. or lower, more preferably 50-5° C.

Figure 3:
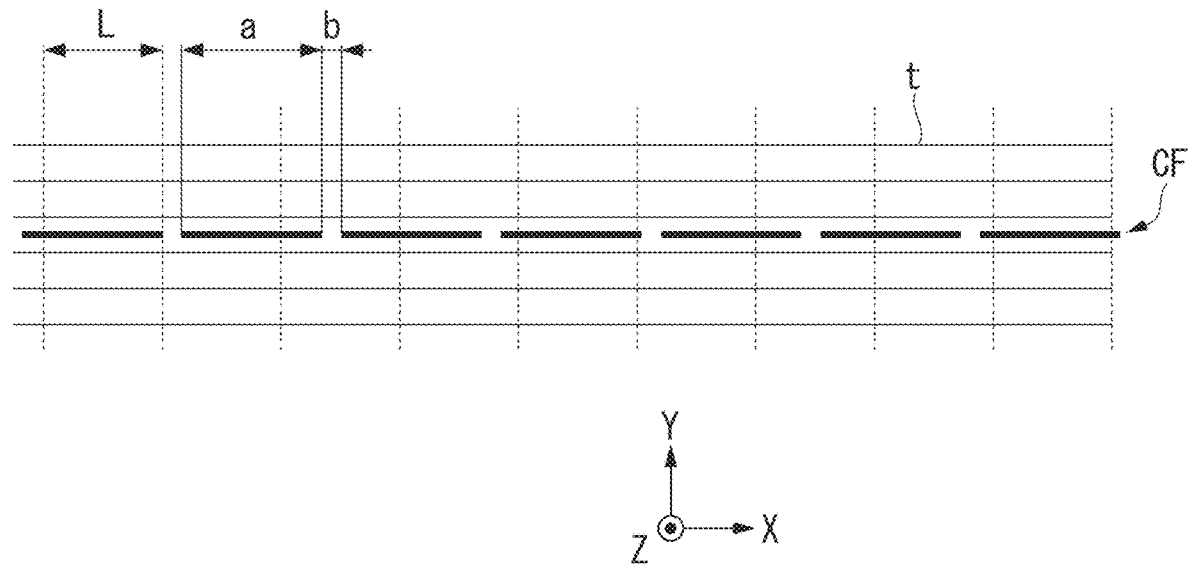
FIG. 3 is a schematic view showing the separation positions of separated fiber bundles.

Separation positions of separated fiber bundles CF are described by referring to FIG. 3. In FIG. 3, a tow "t" of an opened fiber bundle CF is shown as a thin line, and a separation line of opened fiber bundle CF is shown as a bold line, and a cut line of opened fiber bundle CF to be cut by cutter 13A is shown as a broken line.

In separated fiber bundles CF, a portion separated by teeth 18a and a portion not separated by teeth 18a are formed alternately in a so-called perforated state as shown in FIG. 3.

In the above condition, even if filaments are askew, meandering or entangled in fiber bundle CF, filaments are partially connected to each other among multiple separated fiber bundles CF. Accordingly, multiple separated fiber bundles CF are transported in a stable condition toward cutter 13A as they maintain an open state in a width direction. Moreover, even when filaments are askew or meandering in a fiber bundle CF, no damage occurs in the fiber bundle CF. Therefore, separated fiber bundles CF are prevented from breaking, and process failure such as a broken fiber bundle CF wrapping around rolls or the like is thereby preventable.

As described above, in the method for producing an SMC of the present embodiment, by forming partially unseparated portions among multiple separated fiber bundles CF, separated fiber bundles CF are supplied to cutter 13A in a stable condition while avoiding being impacted by meandering fiber bundles CF or askew, meandering or entangled filaments that may occur in fiber bundles CF. Moreover, using relatively low-cost large-tow fiber bundles CF, the production cost of an SMC is reduced.

In a cutting step, fiber bundles CF separated in separation unit 13 are cut by cutter 13A, and spread on paste (P). In separation and cutting steps, fiber bundles are separated and cut to satisfy either or both conditions of (1) and (3) described above. By so doing, it is easier to homogeneously disperse reinforcing fibers and to enhance the result of impregnating resin. Accordingly, high quality SMCs are achieved.

In an impregnation step, long second sheet (S2) is unwound from second raw material roll (R2) by second sheet supply unit 14, and paste (P) is coated on second sheet (S2) at a predetermined thickness by second coating unit 15. Next, in impregnation unit 16, lamination mechanism 31 is used to laminate second sheet (S2) on first sheet (S1). Then, using compression mechanism 32, paste (P) and fiber bundles sandwiched between first sheet (S1) and second sheet (S2) are compressed so as to impregnate the thermosetting resin in filaments of fiber bundles. Accordingly, raw material (R) of an SMC is obtained with the thermosetting resin impregnated in filaments of fiber bundles CF.

Raw material R of an SMC is wound in a roll and transferred to the next step. Raw material R of an SMC is cut to predetermined lengths and shipped as a final product of sheet-type SMCs (fiber-reinforced resin molding material). Note that first sheet (S1) and second sheet (S2) are peeled off from the SMC prior to the molding process of the SMC.

The present invention is not limited to the above embodiments. Various modifications are possible within a scope that does not deviate from the gist of the present invention.

Figure 4A:
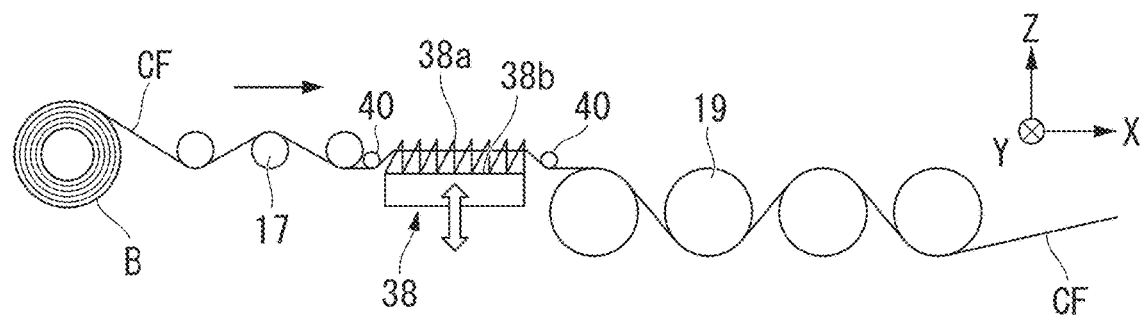
FIG. 4A is a side view showing another structural example of a fiber bundle supply unit equipped in the SMC production apparatus shown in FIG. 1.
Figure 4B:
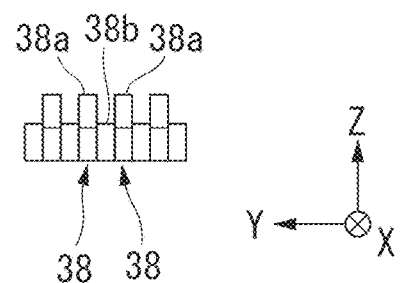
FIG. 4B is a front view of a separation unit seen from the transport direction, showing another structural example of a fiber bundle supply unit equipped in the SMC production apparatus shown in FIG. 1.
Figure 5A:
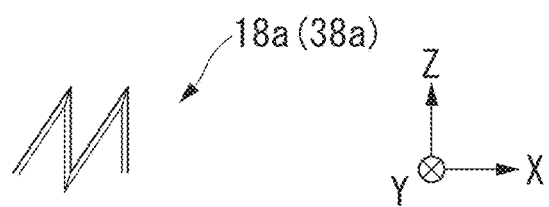
FIG. 5A is a side view showing an example of the shape of a blade.
Figure 5B:
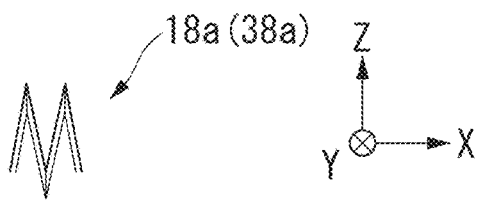
FIG. 5B is a side view showing another example of the shape of a blade.
Figure 5C:
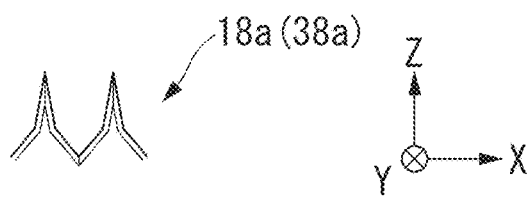
FIG. 5C is a side view showing yet another example of the shape of a blade.
Figure 5D:
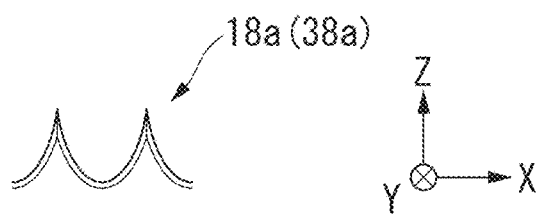
FIG. 5D is a side view showing yet another example of the shape of a blade.
Figure 5E:
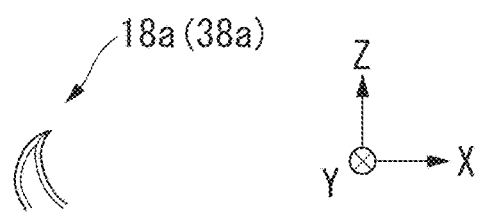
FIG. 5E is a side view showing yet another example of the shape of a blade.

More specifically, in fiber bundle supply unit 10, instead of the aforementioned multiple rotary blades 18, multiple saw blades 38 as shown in FIGS. 4A and 4B, for example, may be used. FIG. 4A is a side view showing another structural example of the fiber bundle supply unit equipped with the SMC production apparatus shown in FIG. 1. FIG. 4B is a front view of the separation unit seen from the transport direction.

Multiple saw blades 38 are disposed at predetermined intervals in a width direction (axis (Y) direction) of opened fiber bundle CF. Also, in each saw blade 38, a series of multiple teeth 38a are aligned in a direction the same as the transport direction of a fiber bundle CF. In saw blades 38, positions of multiple teeth 38a in the transport direction are preferred to correspond to each other. By so setting, piercing is more easily done by teeth 38a of multiple saw blades 38 aligned in a width direction of a fiber bundle CF.

Among saw blades 38, spacer members 38b are positioned. The upper surface of a spacer member 38b is positioned slightly above the border of each of teeth 38a (blade base).

On both sides of multiple saw blades 38 in the transport direction, paired guide members 40 are positioned. Relative to a fiber bundle CF transported between paired guide members 40, multiple saw blades 38 are positioned on the side opposite where paired guide members 40 are arranged and are set to be capable of making a vertical reciprocating (oscillating) motion between a position where multiple teeth 38a pierce a fiber bundle CF and a position away from the fiber bundle CF.

In other words, in a separation step using saw blades 38, a fiber bundle CF is separated in a width direction by multiple teeth 38a intermittently piercing the opened fiber bundle CF while saw blades 38 oscillate vertically (axis (Z) direction). During that time, multiple teeth 38a pierce to the point where spacer members 38b make contact with a continuous fiber bundle CF so as to prevent the fiber bundle CF from continuously being separated by teeth 38a. Accordingly, the same as in using the aforementioned rotary blades 18, multiple separated fiber bundles CF are partially unseparated.

Therefore, in the above embodiment, separated fiber bundles CF are supplied to cutter 13A in a stable condition while avoiding being impacted by meandering fiber bundles CF or askew, meandering or entangled filaments that may occur in fiber bundles CF.

Moreover, using relatively low-cost large-tow fiber bundles CF, the production cost of an SMC is reduced.

In the present invention, in a separation step using rotary blades 18 or saw blades 38, for example, equipped in an SMC production apparatus as described above, it is an option to laminate continuous fiber bundles CF in a thickness direction and separate them into multiple fiber bundles CF.

Moreover, the above-mentioned teeth (18a, 38a) are not limited specifically, as long as they are capable of intermittently piercing a continuous fiber bundle CF. For example, teeth (18a, 38a) may have such shapes that are shown in FIGS. 5A-5E. Moreover, teeth (18a, 38a) may each be single-beveled or double-beveled.

Furthermore, among multiple rotary blades 18 or saw blades 38 positioned adjacent in a width direction (axis (Y) direction), the timing of teeth (18a, 38a) intermittently piercing a fiber bundle CF is not limited to corresponding with each other, and the timing may be shifted from each other.

Figure 6A:
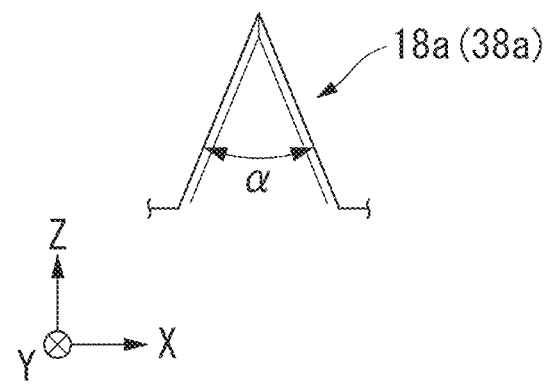
FIG. 6A is a schematic view illustrating the point angle of a blade.
Figure 6B:
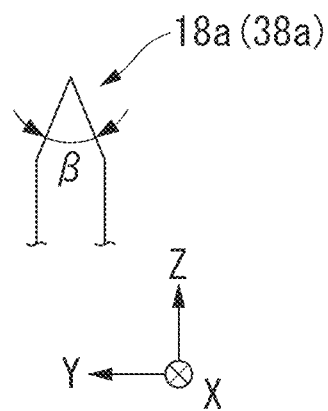
FIG. 6B is a schematic view illustrating the cutting edge angle of a blade.

Yet furthermore, when the angle of the tip of a blade (point angle) shown in FIG. 6A is set as "a" and the angle of a blade (cutting edge angle) shown in FIG. 6B as "D," teeth (18a, 38a) are preferred to have angles that satisfy $30° \leq \alpha \leq 90°$ and $10° \leq \beta \leq 45°$ (more preferably $20° \leq \beta \leq 30°$). The thickness of teeth (18a, 38a) is preferred to be set at 0.3-2 mm.

It is an option for the production apparatus of a fiber-reinforced resin molding material related to the present invention not to include an opening unit.

In the following, the effects of the present invention are made even clearer by the examples below. The present invention is not limited to those examples, and may be practiced through appropriate modifications made within a scope that does not deviate from the gist of the present invention.

Example 1

An SMC was produced by using the above-mentioned SMC apparatus shown in FIGS. 1 and 2.

A separation unit having four rotary blades 18 was used. In each rotary blade 18, a series of six teeth 18a were aligned in a circumferential direction. Each of teeth 18a is set to be substantially triangular, having a maximum thickness of 1 mm at the portion that makes contact with a fiber bundle CF, a maximum width of 1 mm at the portion of the blade that makes contact with a fiber bundle, an angle of 64° at the tip of the blade in a width direction (point angle), and an angle of 30° in a thickness direction of the blade (cutting edge angle). Among rotary blades 18, positions of multiple teeth 18a were set to correspond to each other in a circumferential direction. Spacer members 18b are positioned among rotary blades 18, and the width of each spacer member 18b was set at 2.2 mm.

A carbon fiber bundle (product name: TR 50S15L, number of fibers 15000, made by Mitsubishi Rayon Co., Ltd.) was used for a fiber bundle CF. A vinyl ester resin was used as paste (P).

The fiber bundle CF was widened to have a width of 15 mm by opening bars 17. The transport speed of fiber bundle CF during a separation step was 40 m/min. When separated by using four rotary blades 18, 28.3 mm-long separated portions and 0.5 mm-long unseparated portions were alternately formed continuously in a longitudinal direction of the opened fiber bundle CF, while such portions were formed in four rows, being separated at 3 mm-intervals in a width direction of fiber bundle CF. Separated fiber bundles CF were cut by cutter 13A every 25.4 mm in a longitudinal direction. Cut fiber bundles CF were spread on paste (P) coated on first sheet (S1). The value of "a/L" was 1.11, and "a/(a+b)" was 0.98.

In the above production of SMC, separated fiber bundles CF were supplied to cutting unit 13 in a stable condition without such an incident as some fiber bundles wrapping around rolls or the like. Some cut fiber bundles CF contained unseparated portions, but the amount was not at such a level that would affect the dispersibility of fiber bundles CF on paste (P). The quality of the obtained SMC was substantially the same as an SMC formed with chopped carbon fiber bundles of the same size prepared by using a carbon fiber bundle CF with a smaller number of fibers (number of fibers: 3000) without going through a separation step.

Example 2

An SMC was produced by using the above-mentioned SMC apparatus shown in FIGS. 1 and 2.

A separation unit having one rotary blade 18 was used. Each of teeth 18a was set to be substantially triangular, having a maximum thickness of 0.5 mm at the portion that makes contact with a fiber bundle CF, a maximum width of 0.5 mm at the portion of the blade that makes contact with a fiber bundle, an angle of 64° at the tip of the blade in a width direction (point angle), and an angle of 30° in a thickness direction of the blade (cutting edge angle). Among rotary blades 18, positions of multiple teeth 18a were set to correspond to each other in a circumferential direction. Spacer members 18b are positioned among rotary blades 18, and the width of each spacer member 18b is set at 24.5 mm.

A carbon fiber bundle (product name: TRW40 50L, number of fibers 50000, made by Mitsubishi Rayon Co., Ltd.) was used for a fiber bundle CF. A vinyl ester resin was used as paste (P).

The fiber bundle CF was widened to have a width of 25 mm by using opening bars 17. The transport speed of fiber bundle CF during a separation step was 40 m/min. When separated by using four rotary blades 18, 28.3 mm-long separated portions and 0.6 mm-long unseparated portions were formed in the opened fiber bundle CF. Separated fiber bundle CF was cut by cutter 13A every 25.4 mm in a longitudinal direction. Cut fiber bundles CF were spread on paste (P) coated on first sheet (S1). The value of "a/L" was 1.11, and "a/(a+b)" was 0.98.

In the above production of SMC, separated fiber bundles CF were supplied to cutting unit 13 in a stable condition without such an incident as some fiber bundles wrapping around rolls or the like. Some cut fiber bundles CF contained unseparated portions, but the amount was not at such a level that would affect the dispersibility of fiber bundles CF on paste (P). The quality of the obtained SMC was substantially the same as an SMC formed with chopped carbon fiber bundles of the same size prepared by using a carbon fiber bundle CF with a smaller number of fibers (number of fibers: 3000) without going through a separation step.

Comparative Example 1

Using the same apparatus as in Example 1, a carbon fiber bundle (product name: TR 50S15L, number of fibers 15000, made by Mitsubishi Rayon Co., Ltd.) was used. The fiber bundle CF was widened to have a width of 15 mm by opening bars 17. The transport speed of fiber bundle CF during a separation step was 40 m/min. When separated by using four rotary blades 18, 20.4 mm-long separated portions and 1 mm-long unseparated portions were alternately aligned continuously in a longitudinal direction of the opened fiber bundle CF, while such portions were formed in four rows, being separated at 3-mm intervals in a width direction of the fiber bundle CF. The separated fiber bundles CF were cut by cutter 13A every 25.4 mm in a longitudinal direction. Cut fiber bundles CF were spread on paste (P) coated on first sheet (S1). The value of "a/L" was 0.8, and "a/(a+b)" was 0.95.

In the above production of SMC, separated fiber bundles CF were supplied to cutting unit 13 in a stable condition without such an incident as some fiber bundles wrapping around rolls or the like. Some cut fiber bundles CF contained unseparated portions, but the amount was not at such a level that would affect the dispersibility of fiber bundles CF on paste (P). Regarding the quality of the obtained SMC, since some of the cut fiber bundles were undetached, its strength was about 30% lower than in an SMC formed with chopped carbon fiber bundles of the same size prepared by using a carbon fiber bundle CF with a smaller number of fibers (number of fibers: 3000) without going through a separation step.

Comparative Example 2

Using the same apparatus as in Example 1, a carbon fiber bundle (product name: TR 50S15L, number of fibers 15000, made by Mitsubishi Rayon Co., Ltd.) was used. The fiber bundle CF was widened to have a width of 15 mm by opening bars 17. The transport speed of fiber bundle CF during a separation step was 40 m/min. When separated by using four rotary blades 18, 28.3 mm-long separated portions and 3.5 mm-long unseparated portions were alternately formed continuously in a longitudinal direction of the opened fiber bundle CF, while such portions were formed in four rows, being separated at 3 mm-intervals in a width direction of the fiber bundle CF. Separated fiber bundles CF were cut by cutter 13A every 25.4 mm in a longitudinal direction. Cut fiber bundles CF were spread on paste (P) coated on first sheet (S1). The value of "a/L" was 1.11, and "a/(a+b)" was 0.89.

In the above production of SMC, separated fiber bundles CF were supplied to cutting unit 13 in a stable condition without such an incident as some fiber bundles wrapping around rolls or the like. Some cut fiber bundles CF contained unseparated portions, but the amount was not at such a level that would affect the dispersibility of fiber bundles CF on paste (P). Regarding the quality of the obtained SMC, since some of the cut fiber bundles were undetached, its strength was about 30% lower than in an SMC formed with chopped carbon fiber bundles of the same size prepared by using a carbon fiber bundle CF with a smaller number of fibers (number of fibers: 3000) without going through a separation step.

Comparative Example 3

Using the same apparatus as in Example 1, a carbon fiber bundle (product name: TR 50S15L, number of fibers 15000, made by Mitsubishi Rayon Co., Ltd.) was used. The fiber bundle CF was widened to have a width of 15 mm by opening bars 17. The transport speed of fiber bundle CF during a separation step was 40 m/min. When separated by using four rotary blades 18, 28.3 mm-long separated portions and 0 mm-long unseparated portions are alternately aligned continuously in a longitudinal direction of the opened fiber bundle CF, while such portions are formed in four rows, being separated at 3-mm intervals in a width direction of fiber bundle CF. Separated fiber bundles CF were cut by cutter 13A every 25.4 mm in a longitudinal direction. Cut fiber bundles CF were spread on paste (P) coated on first sheet (S1). The value of "a/L" was 1.11, and "a/(a+b)" was 1.

In the above production of SMC, some separated fiber bundles CF were wrapped around rolls or the like, and an SMC was unable to be obtained.

DESCRIPTION OF NUMERICAL REFERENCES

10 . . . fiber bundle supply unit, 11 . . . first sheet supply unit, 12 . . . first coating unit, 13 . . . cutting unit, 13A . . . cutter, 14 . . . second sheet supply unit, 15 . . . second coating unit, 16 . . . impregnation unit, 18 . . . rotary blade, 18$a$ . . . tooth, 18$b$ . . . spacer member, 20 . . . first transport unit, 28 . . . second transport unit, 31 . . . lamination mechanism, 32 . . . compression mechanism, 38 . . . saw blade, 38$a$ . . . saw tooth, 38$b$ . . . spacer member, 40 . . . guide member, CF . . . fiber bundle, P . . . paste (thermosetting resin), S1 . . . first sheet, S2 . . . second sheet, S3 . . . laminated sheet, R . . . raw material of SMC (fiber-reinforced resin molding material)

What is claimed is:

1. A method of manufacturing a sheet-type fiber-reinforced resin molding material comprising cut fiber bundles impregnated with a resin, comprising:
   producing a separated continuous fiber bundle having separated portions and unseparated portions by intermittently separating a continuous fiber bundle with a moving blade structure,
   cutting the separated continuous fiber bundle at intervals in a longitudinal direction to produce cut fiber bundles, and
   impregnating the cut fiber bundles with the resin to produce the sheet-type fiber-reinforced resin molding material,
   wherein, in the separated continuous fiber bundle, the separated portions and the unseparated portions alternate continuously in a direction along a length of the separated continuous fiber bundle,
   wherein the moving blade structure includes a spacer member positioned between a plurality of blades such that the plurality of blades are placed with a predetermined interval along a width direction of the continuous fiber bundle, and wherein the separated continuous fiber bundle satisfies a condition specified in formula (3):

$$0.9 \leq a/(a+b) < 1 \qquad (3)$$

wherein

"a" is a length (millimeter) of the separated portion of the separated continuous fiber bundle, and "b" is a length (millimeter) of the unseparated portion of the separated continuous fiber bundle.

2. The method according to claim 1, further comprising the cutting satisfies a condition specified in formula (1):

$$1 \leq a/L \qquad (1)$$

wherein

"a" is a length (millimeter) of the separated portion of the separated continuous fiber bundle, "L" is a fiber length (millimeter) of the cut fiber bundle produced by the cutting.

3. The method according to claim 2, wherein the cutting further satisfies a condition specified in formula (2):

$$a/L \leq 10 \qquad (2).$$

4. The method according to claim 1, wherein the resin comprises a thermosetting resin.

5. The method according to claim 1, wherein the continuous fiber bundle comprises a carbon fiber.

6. The method according to claim 1, wherein the plurality of blades oscillates vertically.

7. The method according to claim 1, wherein the plurality of blades pierce the continuous fiber bundle up to a point where the spacer member contacts with the continuous fiber bundle.

8. The method according to claim 1, wherein the plurality of blades rotates.

9. The method according to claim 1, wherein a maximum thickness of the blade at a portion of the blade which contacts the fiber bundle is 2 mm or less.

10. The method according to claim 1, wherein the method further comprises widening the continuous fiber bundle in the width direction of the continuous fiber bundle before the intermittently separating.

11. The method according to claim 1, wherein the continuous fiber bundle is a carbon fiber bundle and a temperature of the continuous fiber bundle is 50° C. or less and 5° C. or more.

12. The method according to claim 1, wherein a pair of guide members are positioned on both sides of the plurality of blades in a transport direction of the continuous fiber bundle, and the plurality of blades are positioned to pierce the continuous fiber bundle from the side opposite where the paired guide members are disposed.

13. The method according to claim 1, further comprising:
coating a first sheet and a second sheet each with a paste containing the thermosetting resin,
spreading the cut fiber bundles on the first sheet coated with the paste, and
laminating the first sheet and the second sheet such that the paste on each sheet and the cut fiber bundles on the first sheet are sandwiched between the first sheet and the second sheet,
wherein the impregnating includes compressing the paste and the cut fiber bundles between the first sheet and the second sheet.

14. A method of producing a molded article, comprising manufacturing a sheet-type fiber-reinforced resin molding material by the method according to claim 1 and molding the molded article by using the sheet-type fiber-reinforced resin molding material as an intermediate material.

* * * * *